US010308534B2

(12) United States Patent
Fleck et al.

(10) Patent No.: US 10,308,534 B2
(45) Date of Patent: *Jun. 4, 2019

(54) PERSONAL ADVANCED OXIDATION WATER TREATMENT SYSTEM (71) Applicants: Michael J. Fleck, Huntley, IL (US); John A. Pidgeon, Great Falls, VA (US)

(72) Inventors: Michael J. Fleck, Huntley, IL (US); John A. Pidgeon, Great Falls, VA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/490,500

(22) Filed: Apr. 18, 2017

(65) Prior Publication Data
US 2017/0320760 A1 Nov. 9, 2017

Related U.S. Application Data (63) Continuation of application No. 14/659,443, filed on Mar. 16, 2015, which is a continuation of application
(Continued)

(51) Int. Cl.
*B01J 21/06* (2006.01)
*B01J 35/00* (2006.01)
(Continued)

(52) U.S. Cl.
CPC ............... *C02F 1/78* (2013.01); *B01J 21/063* (2013.01); *B01J 35/004* (2013.01); *C01B 13/11* (2013.01); *C02F 1/002* (2013.01); *C02F 1/725* (2013.01); *C01B 2201/62* (2013.01); *C02F 2201/002* (2013.01); *C02F 2201/008* (2013.01); *C02F 2201/009* (2013.01); *C02F 2201/782* (2013.01);
(Continued)

(58) Field of Classification Search
CPC ....... B01J 23/063; B01J 35/004; C01B 13/11; C01B 2201/62; C02F 1/002; C02F 1/725; C02F 1/78; C02F 2201/002; C02F 2201/008; C02F 2201/009; C02F 2201/782; C02F 2303/04; C02F 2305/023; Y02A 20/211; Y02A 20/212; Y02A 20/214
See application file for complete search history.

(56) References Cited

U.S. PATENT DOCUMENTS 4,609,466 A 9/1986 McCausland et al.
5,019,252 A 5/1991 Kamei et al.
(Continued)

OTHER PUBLICATIONS

II. Dept. of Energy & Nat. Resources, HWRIC RR-037, Peyton et Fleck, Field Scale Evaluation of Aquifer and Wastewater Cleanup using a Mobile Oxidation Pilot Plant (MOPP), Oct. 1989, Document Supplied in Parent Case.

*Primary Examiner* — Lucas A Stelling
(74) *Attorney, Agent, or Firm* — Clifford H. Kraft (57) ABSTRACT

A portable, personal advanced-oxidation water treatment system based on ozone and a catalyst such as titanium dioxide that can cycle and purify water to make it potable by removing organic contaminants. The unit can be used for long periods of time without having to replenish the active portions. The unit can be carried in a backpack or in a vehicle. Fresh water is typically loaded into the unit, and the unit is cycled until the water is pure enough to drink. A battery is used to produce ozone and to cycle the water through a reaction vessel and can optionally be charged with a small solar panel The unit can also be powered directly from a vehicle.

19 Claims, 6 Drawing Sheets

Related U.S. Application Data

No. 13/112,066, filed on May 20, 2011, now Pat. No. 8,980,105.

(51) Int. Cl.
    *C01B 13/11*     (2006.01)
    *C02F 1/72*     (2006.01)
    *C02F 1/78*     (2006.01)
    *C02F 1/00*     (2006.01)

(52) U.S. Cl.
    CPC .... *C02F 2303/04* (2013.01); *C02F 2305/023* (2013.01); *Y02A 20/211* (2018.01); *Y02A 20/212* (2018.01); *Y02A 20/214* (2018.01)

(56) References Cited

U.S. PATENT DOCUMENTS

| | | | |
|---|---|---|---|
| 5,873,996 A | 2/1999 | Rozelle et al. | 210/104 |
| 6,863,827 B2 | 3/2005 | Saraceno | |
| 7,575,678 B2 | 8/2009 | Kuo | |
| 8,980,105 B2 * | 3/2015 | Fleck | C02F 1/002 210/760 |
| 2002/0046957 A1 | 4/2002 | Hough et al. | |
| 2004/0011742 A1 | 1/2004 | Kuo | |
| 2006/0180550 A1 | 8/2006 | Moore, III | |
| 2006/0263281 A1 | 11/2006 | Dial | 422/292 |
| 2007/0199875 A1 | 8/2007 | Moorey et al. | |
| 2009/0001029 A1 * | 1/2009 | Denkewicz, Jr. | C02F 1/78 210/760 |
| 2009/0200215 A1 | 8/2009 | Bathula | |
| 2010/0065506 A1 | 3/2010 | Maiden | 210/739 |
| 2011/0226705 A1 | 9/2011 | Dholakia | 210/750 |

* cited by examiner

PERSONAL ADVANCED OXIDATION WATER TREATMENT SYSTEM

This is a continuation of application Ser. No. 14/659,443 filed Mar. 16, 2015 which was a continuation of application Ser. No. 13/112,066 filed May 20, 2011, now U.S. Pat. No. 8,980,105. Application Ser. Nos. 14/659,443 and 13/112,066 are hereby incorporated by reference in their entireties.

BACKGROUND

Field of the Invention

The present invention relates generally to water treatment and more particularly to a portable advanced oxidation water treatment system that can purify drinking water in the field.

Description of the Prior Art

Potable water is often difficult to obtain during disasters and other emergency situations, during military operations and even recreationally, such as when hiking or camping. Water found on the ground or even in streams and rivers is known to many times contain numerous bacteria, parasites, possible harmful chemicals as well as sand, mud and other substances. While sand and mud can be filtered if the appropriate filter material is available, and bacteria and parasites can be killed by boiling or by chemical additives, chemical contaminants are almost impossible to safely remove. In any case, the separate steps of filtering and boiling require time and the appropriate facilities. Prior art solutions have been to have personnel transport quantities of safe water or possibly carry water treatment additives. Due to the weight and bulk of water, transporting water on the person is definitely limited to small quantities. Highly mobile personnel, such as military units, first responders, search and rescue units, generally carry canteens or personal hydration systems; however, there is seldom enough guaranteed good water in a canteen for more than about one day. Once canteens need to be filled, the problem of water purification arises. Chemical treatment additives, while somewhat effective, do not really solve the problem of water purification, since they do not remove organic substances from the water. Also, it is difficult to treat larger quantities of water with them. It would be very advantageous to have a portable personal water treatment system that could be carried in a backpack, or in the back of a mobility asset such as a truck or four-wheeler, that would purify any fresh water put into it making it potable in a short period of time.

SUMMARY OF THE INVENTION

The present invention relates to a portable, personal advanced oxidation water treatment system based on an activated catalyst that can continue to purify water without having to replenish the active portions for long periods of time. A battery used to produce ozone and to cycle the water can be charged with a small solar panel, or the unit can be powered from a vehicle.

The device can be carried in a backpack, or skid-mounted, for use in a truck, boat, or four-wheeler. Fresh water is loaded into a bladder in the device for purification where it is subsequently cycled through a reaction vessel. The device can contain an integrated filter, or water can be filtered before loading it into the bladder. The invention cycles the water through an advanced-oxidation vessel where ozone is introduced into the stream through a venturi. The mass transfer of ozone ($O_3$) into solution is then available for contact with a semi-conductor catalyst titanium dioxide ($TiO_2$) which is part of a substrate or matrix in the vessel. The combination of dissolved ozone and the catalyst creates an OH radical which is a short-lived, but extremely powerful oxidant, a super-oxide anion ($O_2^-$) and hydrogen peroxide ($H_2O_2$) which are also powerful oxidants. The presence of these strong oxidants in solution, as well as other intermediate reactants, provides superior disinfectant and oxidant properties that can be utilized to purify water and make it potable. These components are many orders of magnitude stronger than chlorinated tablets or other treatment additives.

As previously stated, the present invention can be designed to operate either on a stored battery with an optional solar panel recharger that can be part of a backpack arrangement, or by powering the unit from a vehicle. A particular embodiment of the invention can be powered either way, including a portable battery mode where a vehicle power supply can be used to recharge the battery in the backpack. The battery or vehicle power is used solely to create ozone and to power a small water circulation pump. The treatment time required can vary based on the amount of power available as well as the matrix of contaminants/bacteria/viruses/micro-organisms in the water supply. Because the present invention relates to a self-contained, regenerative and catalytic process, the unit will eventually oxidize and disinfect a large supply of water. All that is required is enough time to generate sufficient quantities of ozone and to circulate the supply water through the treatment vessel.

DESCRIPTION OF THE FIGURES

Attention is now drawn to several drawings that illustrate features of the present invention.

Several drawings and illustrations have been presented to aid in understanding the present invention. The scope of the present invention is not limited to what is shown in the figures.

DETAILED DESCRIPTION OF THE INVENTION

Figure 1:
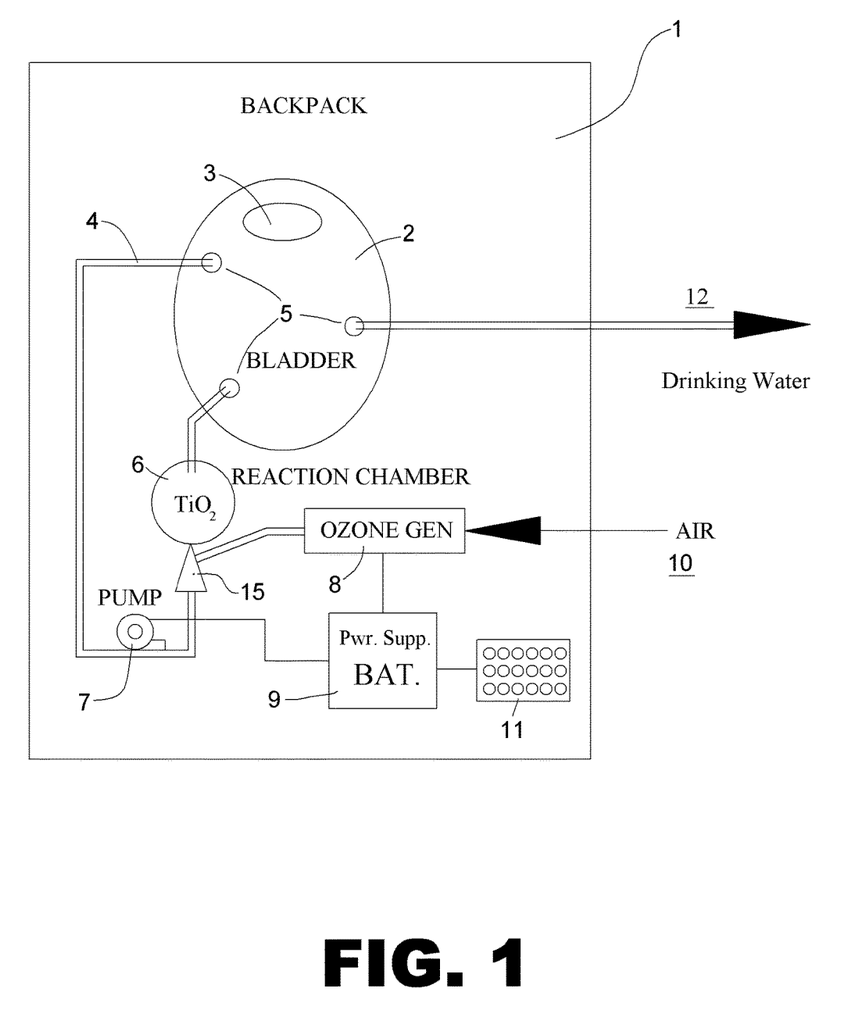
FIG. 1 shows a schematic diagram of an embodiment of the invention.

The present invention relates to a backpack or vehicle contained personal advanced-oxidation water treatment system. Turning to FIG. 1, a schematic diagram of an embodiment of the invention can be seen. A backpack 1 or other containment structure holds a bladder 2 that can be filled with water to be purified through a filler port 3. A filler apparatus can optionally contain a sediment filter (fine screen), or water can be separately filtered before being placed in the unit.

The bladder 2 typically contains three access points (other than the filler port). A first access point is used to remove purified water 12 from the unit; a second access point cycles water to be further purified through a tube 4 and small pump 7 and forces it into a reaction vessel 6 through a venturi 15.

The venturi 15 pulls in ozone from an ozone generator 8 and mixes it with the incoming water. The third access point allows water from the reaction vessel 6 to return to the bladder 2.

The reaction vessel 6 contains titanium dioxide in a substrate such that the circulating water contacts it over a large surface area. While titanium dioxide is the preferred catalyst, any catalyst capable of purifying water from organic materials is within the scope of the present invention. An ozone generator 8 powered by a power supply 9 produces ozone from air 10 and injects it into the water in the venturi 15 as previously described. The ozone-water mixture is then injected into the reaction chamber. The power supply 9 can contain a battery and an optional solar panel 11 for charging the battery, or it can be powered externally. The ozone generator 8 can be any type of device capable of generating ozone from air. It typically contains a corona discharge where the reaction $O_2 \rightarrow O_3$ takes place; however, it can also contain a high-power ultra-violet lamp (with wavelength less than 254 nM typically) or a method of in-situ ozone generation. While in-situ ozone generation techniques would provide an advantage of not needing as much electrical power, they have not yet been sufficiently proven in the art. Therefore, the preferred method of generating ozone is with a corona discharge. Any ozone generator or generation method is within the scope of the present invention.

The bladder 2 should be made from material able to stand strong oxidant conditions. Preferred materials are those sold under the trademarks VITRON™, TEFLON™, and high-density polyethylene (HDPE). Any material possessing similar oxidation resistant properties is within the scope of the present invention. Water tubes can be made of TEFLON™, HDPE or other suitable liquid tubing material. The bladder fill port 3 and other access points can be made of stainless steel and mounted to the bladder 2.

Water is continually circulated through the system shown in FIG. 1 for as long as necessary to purify it. The oxidation in the reaction vessel 6 eliminates organic contaminants and destroys viruses and bacteria. Residual ozone in solution causes the effect to continue with new ozone being continuously introduced to maintain an approximately constant oxidant level in solution.

After the potable water is removed from the bladder 2, the bladder can be flushed with other water to remove any collected contaminates in the bottom and prepare it for another cycle. When not in use, the bladder can remain open to dry, preventing the growth of mold or fungi when the device is not in use. Of course, any possible mold or fungi that might attach to the inside of the bladder will be killed and removed by the oxidants whenever the device is used again. The system can optionally contain one or more sediment traps in the bottom of the bladder 2 or reaction vessel 6 to accumulate any remaining sediment that might be in the water. If ambient air is introduced into to bladder 2, a relief valve, preferably of stainless steel, can be used to keep the pressure down. In some embodiments of the invention, elevated pressure can be used to promote circulation of the water thus reducing power consumption.

Figure 2:
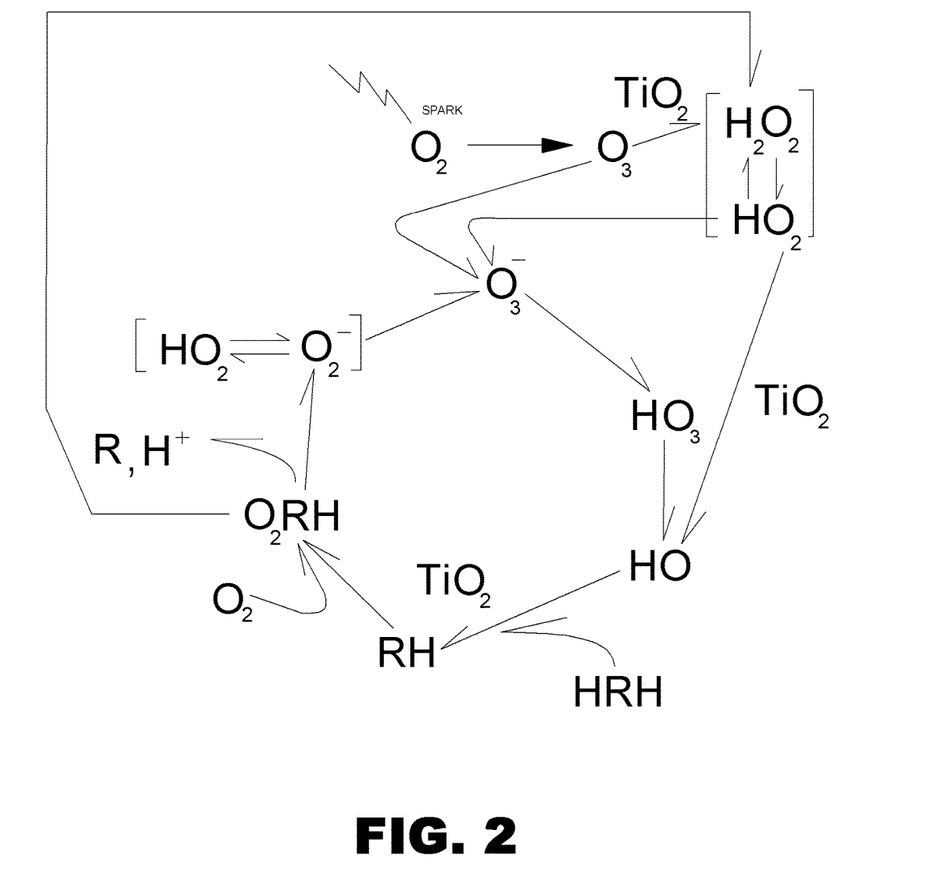
FIG. 2 shows an overview of part of the chemical cycle employed by the invention.

FIG. 2 shows an example of a chemical cycle that can be employed with the present invention. A spark or other process converts $O_2$ to $O_3$ generally in the gas phase. $TiO_2$ causes the $O_3$ to form the $O_3^-$ ion and causes an equilibrium to be established between $H_2O_2$ and $HO^2$. Some of these products also convert under the $TiO_2$ to $O_3^-$. The $TiO_2$ causes $O_3^-$ to convert to $HO_3$ which then becomes HO, and some of the $HO_2$ to converts directly to HO.

The symbol R in FIG. 2 represents any organic moiety. HO reacts with HRH and RH compounds and $O_2$ in the presence of $TiO_2$ to form $O_2RH$ oxidized compounds which breakup into R and H+ and also the oxidant $O_2^-$ which generally forms more $O_3^-$ as the cycle continues. This process happens continuously as the water circulates until the R units are totally broken down to $CO_2$ and water. The short-lived oxidants disappear from the solution when the cycle is stopped leaving pure, potable water.

The titanium dioxide/ozone cycle of the present invention can be extended to also remove heavy metal ions (through electrolysis or other means) if desired; however, this is usually not necessary since the vast majority of contaminants in fresh water found in the field that prevent the water from being safe to drink are organic in nature, especially living organisms. The present invention completely eliminates these.

Figure 3:
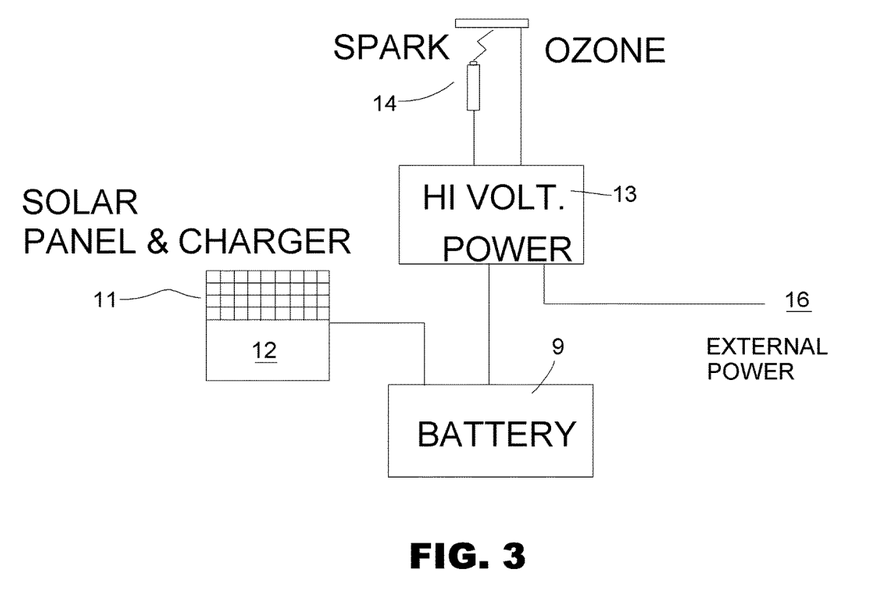
FIG. 3 shows a block diagram of a battery, solar panel and ozone generator.

FIG. 3 shows schematic details of an embodiment of ozone generator and power supply. A corona discharge 14 converts air to ozone. The spark current is supplied from a high voltage power supply 13 which can be driven from a battery 9 or from an external supply 16. An optional solar panel 11 can produce electric current that is converted to charging current through a charger 12 which then charges the battery 9. This charging process typically takes place while the backpack version of the invention is being carried. In various embodiments of the invention, the portable battery can be charged directly from a vehicle and/or the entire unit can be powered from the vehicle.

Figure 4:
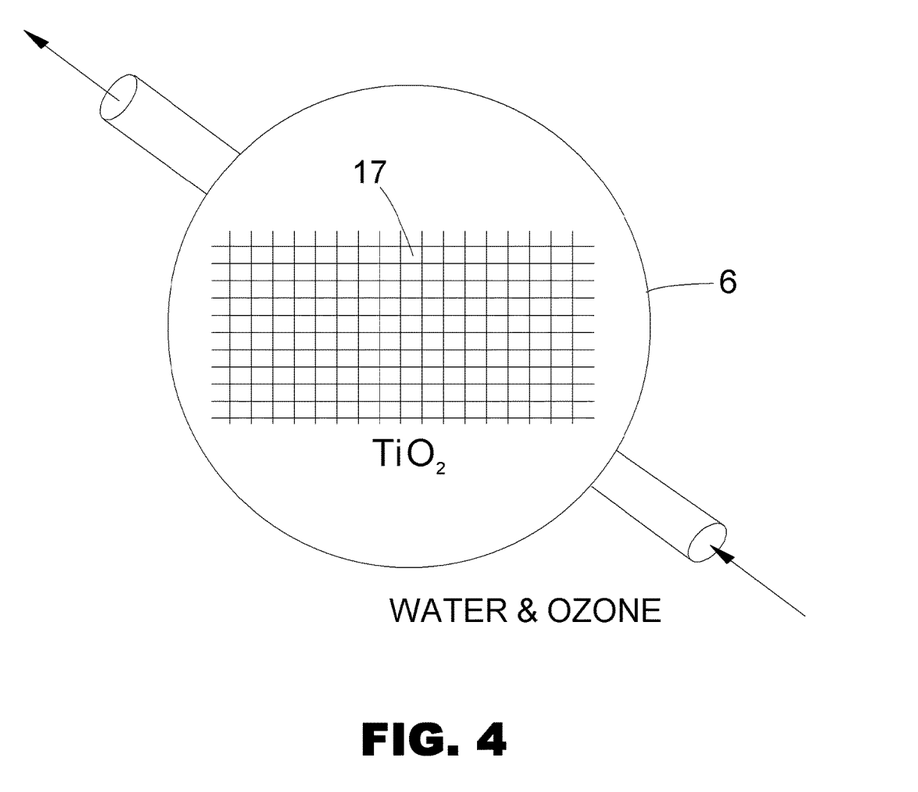
FIG. 4 shows the interior of an embodiment of a reaction vessel.

FIG. 4 shows details of an embodiment of a reaction chamber 6. Titanium dioxide can be embedded in a high-surface area substrate 17. Water is enters the chamber 6 from a venturi that is used to pull in ozone gas generated by the corona discharge or other ozone generator. The matrix 17 should be course enough to allow sufficient water flow, but have enough reaction surface area to provide a large contact area with the $TiO_2$.

Figure 5:
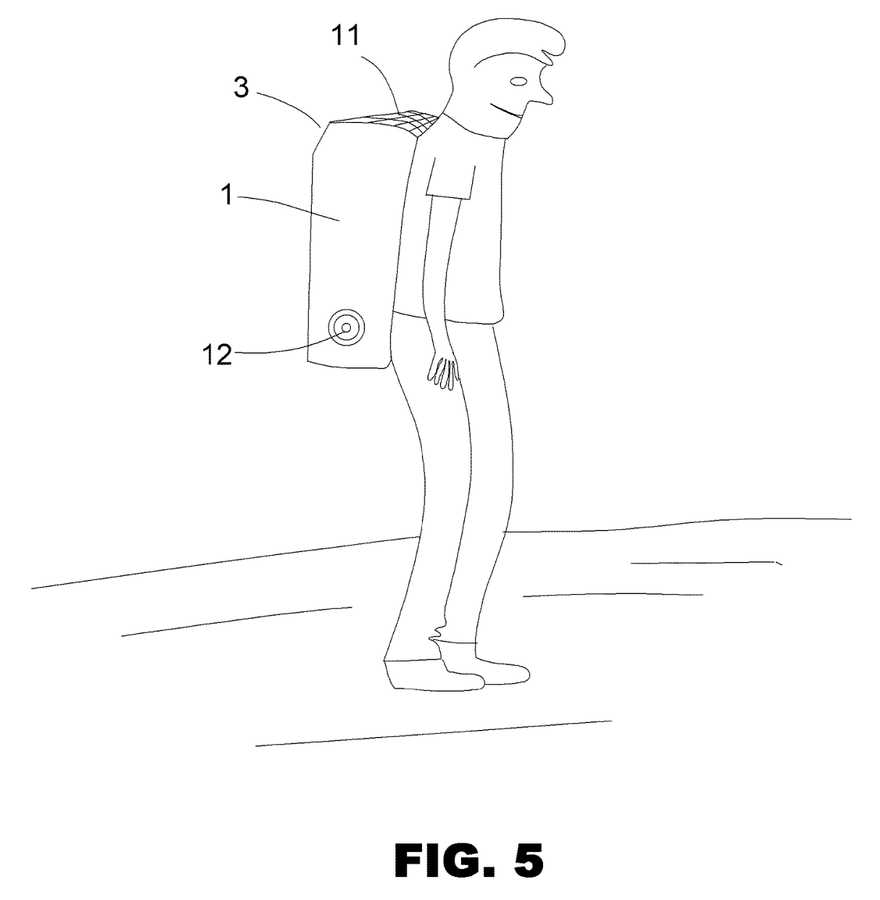
FIG. 5 shows an embodiment of the present invention in a backpack.
Figure 6:
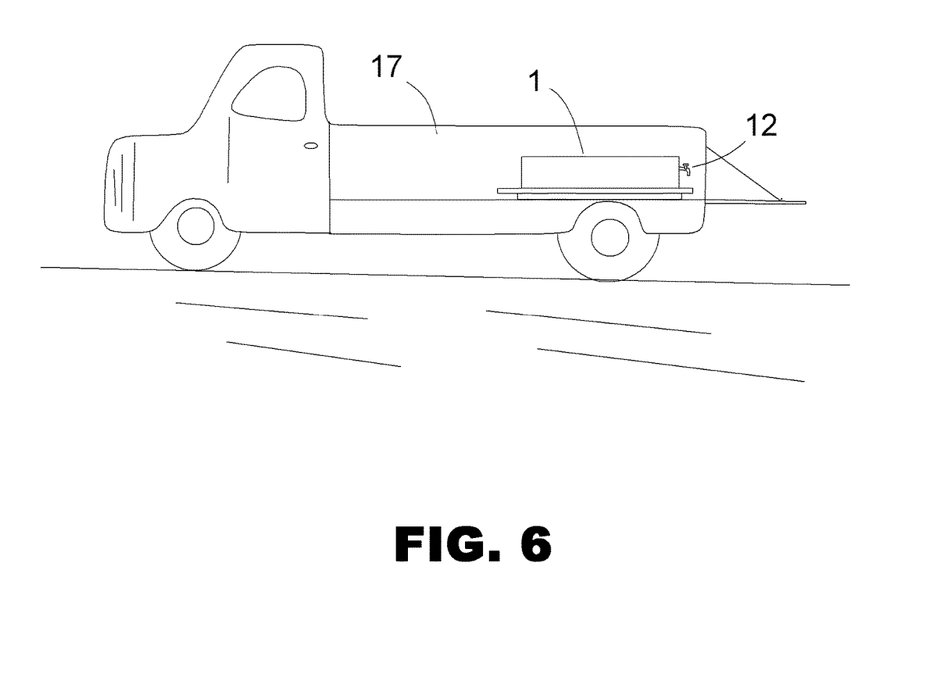
FIG. 6 shows an embodiment of the present invention on a skid in a truck or other vehicle.

FIG. 5 shows an embodiment of the present unit 1 contained in a backpack. The solar panel 11 can be seen on top of the backpack, while water entry can be through a port 3 accessible by opening the backpack. Fresh water can optionally be supplied from a valve or port 12 on the side of the backpack. FIG. 6 shows a skid version of the invention 1 that can slide into the back of a truck 17 or other vehicle. Fresh water can be accessible from a valve and port 12 near the rear of the skid. This embodiment is particularly advantageous for camping or base camps and other activities that take place close to a parked vehicle.

Several descriptions and illustrations have been presented to aid in understanding the present invention. One skilled in the art will understand that numerous changes and variations can be made without departing from the spirit of the present invention. Each of these changes and variations is within the scope of the present invention.

We claim:

1. A backpack worn, portable water purification system designed so that a single user can purify a quantity of water by putting into a tank, charging it with ozone gas and re-circulating it through a reaction chamber until potable, the system comprising:

a backpack sized to be worn by a user;

the water tank, a pump, a venturi and the reaction vessel all contained in the backpack, the water tank fluidly connected through the venturi to the reaction vessel; the reaction vessel fluidly connected back to the tank;

an ozone generator also contained in the backpack producing ozone gas, the ozone generator being gas-connected to the venturi so that ozone gas transfers into the water though the venturi;

the reaction vessel containing a reacting surface coated with titanium dioxide;

the pump continuously recirculating water from the water tank into the reaction vessel and back to the water tank;

a drain on the water tank constructed to allow a user to remove potable water from the water tank.

2. The portable water purification system of claim 1 further comprising a battery powering at least the ozone generator and the pump.

3. The portable water purification system of claim further comprising a solar panel to recharge the battery.

4. The portable water purification system of claim 1 wherein the titanium dioxide in contained in a high-surface area matrix.

5. The portable water purification system of claim 1 further comprising a filler apparatus attached to the water tank that can optionally contain a sediment filter.

6. The portable water purification system of claim 1 further comprising a filler apparatus attached to the water tank that contains a sediment filter.

7. The portable water purification system of claim 6 wherein the sediment filter is a fine screen.

8. The portable water purification system of claim 1 wherein the ozone generator includes a corona discharge device.

9. The portable water purification system of claim 1 wherein the ozone generator is an ultra-violet lamp.

10. The portable water purification system of claim 1 further comprising one or more sediment traps in the bottom of the water tank or the reaction vessel.

11. A backpack worn, portable water purification system designed so that a single user can purify a quantity of water by putting into a tank, charging it with ozone gas and re-circulating it through a reaction chamber until potable, the system comprising:

a backpack sized to be worn by a user;

the water tank, a pump, a venturi and the reaction vessel all contained in the backpack, the water tank fluidly connected through the venturi to the reaction vessel; the reaction vessel fluidly connected back to the tank;

an ozone generator also contained in the backpack producing ozone gas, the ozone generator being gas-connected to the venturi so that ozone gas transfers into the water though the venturi;

the reaction vessel containing a reacting surface coated with a catalyst;

the pump continuously recirculating water from the water tank into the reaction vessel and back to the water tank.

12. The portable water purification system of claim 11 wherein the catalyst is titanium dioxide.

13. The portable water purification system of claim 11 further comprising a drain on the water tank constructed to allow a user to remove potable water from the water tank.

14. The portable water purification system of claim 11 further comprising a battery contained in the backpack powering at least the ozone generator and the pump.

15. The portable water purification system of claim 14 further comprising a solar panel attached to the backpack to recharge the battery.

16. A backpack worn, portable water purification system designed so that a single user can purify a quantity of water by putting into a tank, charging it with ozone gas and re-circulating it through a reaction chamber until potable, the system comprising:

a backpack sized to be worn by a user;

the water tank, a pump, and the reaction vessel all contained in the backpack, the water tank fluidly to the reaction vessel; the reaction vessel fluidly connected back to the tank;

an ozone generator also contained in the backpack producing ozone gas, the ozone generator being gas-connected reaction chamber so that ozone gas transfers into the water in the reaction chamber;

the reaction vessel containing a reacting surface coated with a catalyst;

the pump continuously recirculating water from the water tank into the reaction vessel and back to the water tank.

17. The portable water purification system of claim 16 wherein the catalyst is titanium dioxide.

18. The portable water purification system of claim 16 further comprising a battery contained in the backpack powering at least the ozone generator and the pump.

19. The portable water purification system of claim 18 further comprising a solar panel to recharge the battery.

* * * * *